United States Patent [19]
Mössner et al.

[11] Patent Number: 5,822,840
[45] Date of Patent: Oct. 20, 1998

[54] METHOD OF MANUFACTURING SPRING HINGES

[75] Inventors: Heinz Mössner, Ispringen; Otto Lehnert, Sinsheim, both of Germany

[73] Assignee: O B E-Werk Ohnmacht & Baumgärtner GmbH & Co. KG, Ispringen, Germany

[21] Appl. No.: 615,765

[22] Filed: Mar. 14, 1996

[30] Foreign Application Priority Data

Apr. 27, 1995 [DE] Germany ............ 195 15 495.9

[51] Int. Cl.⁶ ............................................ B21D 53/40
[52] U.S. Cl. ............................ 29/11; 29/417; 29/418; 16/228
[58] Field of Search .................. 29/11, 20, 412, 29/417, 418, 33 Q, 437, 438, 439, 440; 16/228; 351/153

[56] References Cited

U.S. PATENT DOCUMENTS

| | | | |
|---|---|---|---|
| 442,656 | 12/1890 | Whittlesey | 29/412 |
| 3,588,990 | 6/1971 | Klaus et al. | 29/417 |
| 3,691,601 | 9/1972 | Hough | 29/417 |
| 4,485,544 | 12/1984 | Van Ryswyk | 29/417 |
| 5,400,090 | 3/1995 | Chen . | |
| 5,533,233 | 7/1996 | Wagner et al. | 16/228 |
| 5,657,107 | 8/1997 | Wagner et al. | 16/228 |

FOREIGN PATENT DOCUMENTS

| | | |
|---|---|---|
| 2342314 | 2/1975 | Germany . |
| 3414641 | 10/1985 | Germany . |

*Primary Examiner*—David P. Bryant
*Attorney, Agent, or Firm*—Anderson, Kill & Olick, P.C.

[57] ABSTRACT

A method of manufacturing a spring hinge including forming a spring hinge housing and a hinge member of strip materials, and assembling a unitary assembly formed of at lest the hinge member and a spring member by mounting the spring member on the hinge member while the hinge member is still connected with a strip material from which it is formed, with the separation of the hinge member from the strip material after mounting of the spring member on the hinge member.

5 Claims, 10 Drawing Sheets

METHOD OF MANUFACTURING SPRING HINGES

RELATING DOCUMENTS

The subject matter of this application corresponds to the subject matter of Disclosure Document No. 377621 filed May 25, 1995.

BACKGROUND OF THE INVENTION

The present invention relates to a method of manufacturing of a spring hinge and including assembling a unitary unit formed at least of a hinge member and a spring member.

Spring hinges are well known. They generally include a housing in which a spring member is received. The spring member provides for pivoting of an ear-piece connected with the spring hinge into a wear position and applies to the ear-piece a preload with which the ear-piece is pressed against the head of a glasses wearer. However, the manufacturing of the spring hinge is rather expensive. On one hand, machining of the spring hinge parts is required and, on the other hand, the use of expensive profile materials is needed.

In addition, the assembly of a unit which usually consists of a spring member, a hinge member and a closing member is rather complicated because of small dimensions of these members. Because the components are usually produced in a bulk production, their alignment during assembly, necessary for mounting them in correct positions, is rather expensive.

Accordingly, an object of the invention is a method of manufacturing of spring hinges which is inexpensive and facilitates handling of separate components forming a spring hinge.

SUMMARY OF THE INVENTION

This and other objects of the invention, which will become apparent hereinafter, are achieved by providing a method of manufacturing a spring hinge including forming the hinge member from a strip-shaped material, and mounting the closing member, likewise formed of a strip material, and the spring member on the hinge member while the hinge member is still connected with the strip-shaped material.

Because the hinge member is formed of a strip material, and the closing and spring members are mounted thereon while the hinge member is still connected with the strip material, the steps of inspecting the components before their assembly and their alignment are eliminated.

Because machining operations are eliminated, due to the use of strip materials, the manufacturing of the housing and the hinge member becomes cost-effective. A further advantage results from using a strip material having a uniform thickness for manufacturing of the spring hinge housing. This results in a uniform thickness of the housing walls which prevents softening of the housing wall during an inductive heating for, e.g., effecting soldering of the housing to an ear-piece.

Because the components need not be separated from the strip, their handling is substantially facilitated.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

As discussed above, the spring hinges of the above-described type are used for connecting of the ear-pieces of glasses to a middle section of the glasses. Generally, the spring hinge is attached to the ear-piece, with the hinge member of the spring hinge cooperating with the hinge of the middle section to pivotally connect the ear-piece with the middle section. The ear-piece can be moved from its original, folded position into its wear position, with the spring member of the spring hinge applying a return force.

Figure 1:
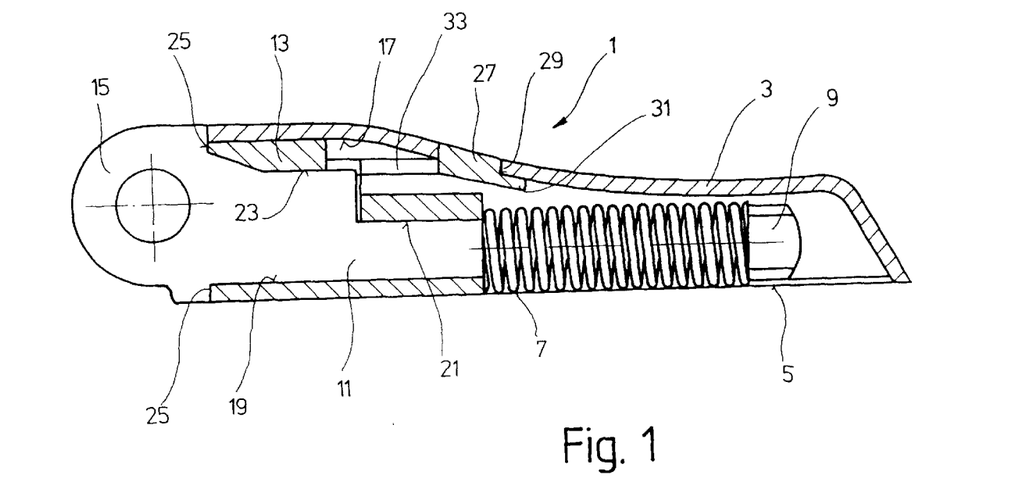
FIG. 1 is a cross-sectional view of a first embodiment of a spring hinge produced according to the present invention.

The spring hinge 1 according to the present invention, which is shown in FIG. 1, includes a housing 3 that is produced of a deformable material, e.g., metal, by a deepdrawing process, preferably by an embossing process. The process, which is used for manufacturing of the housing 3, will be described in detail below with reference to FIG. 16. The housing 3 is open at its bottom 5. A spring member 7, which is formed as a helical spring, is located in the housing 3 and is supported on an elongate extension 9 of a hinge member 11. The extension 9 is formed as an elongate pin that extends through the helical spring and is widened at its end e.g., by crumping, so that an abutment for the helical spring is formed. At its opposite end, the helical spring, i.e. the spring member 7, abuts a closing member 13 which is located in the housing and through which the hinge member 11 extends. The closing member 13 is completely received in the housing 3. The hinge member 11 has a gudgeon 15 at its end projecting out of the housing 3. The gudgeon 15 cooperates with a hinge provided on the middle section of the glasses (not shown). The spring member 7 and the closing member 13 are so dimensioned that no part of the spring member 7 and the closing member 13 projects through the bottom 5 of the housing 3. Rather, the surfaces of the spring member 7 and the closing element 13 are made flash with the bottom surface of the housing 3 which is supported on an outer surface of the ear-piece and is fixedly attached thereto, e.g., by soldering.

The gudgeon 15 and the hinge member 11 are formed as one piece. The extension 9 is also a part of the hinge member 11, so that the number of elements forming the spring hinge according to the present invention is reduced to a minimum. After the spring member 7, which is formed as a helical spring is mounted on the extension 9 the end of which is then the spring member 7 and the hinge member 11 form a unit.

Because the closing element 13 is aligned with the bottom 5 of the housing 3, the bottom of the closing element 13 lies flatly on the outer surface of the ear-piece when the housing 3 is secured to the ear-piece. On the other hand, the closing member 13 is supported, adjacent to the end surface of the housing 3, against the housing inner surface 17. In an assembled condition of the hinge 1, the closing member 13 is optimally retained in the housing 3.

The closing member 13 has a smooth inner surface 19 on which the hinge element 11 lies. The inner surface 19 serves as a first guide surface for the hinge member 11 which is displaceable against the biasing force of the spring member 7. The second guide surface 21 is formed as a result of the hinge member being surrounded, at least partially, by the closing element 13. The third guide surface 23 is formed by an inner surface portion of the closing member 13 which is engaged by a respective surface of the hinge member 11.

The gudgeon 15 is so dimensioned that its stop shoulder 25 abuts an end surface 35 of the housing 3, which thus serves as a stop surface, when the hinge member 11 is drawn to the end surface 35 of the housing 3 by the preloaded spring member 7.

Because the hinge member 11 extends through the closing member 13 and because the spring member 7, which is supported against the wider portion 9 of the hinge member 7, applies a preloading force to the hinge member 11, there is provided a ready-to-be-used assembly consisting of the hinge member 11 the spring member 7, and the closing member 13.

The assembly is inserted into the housing 3 after the housing 3 is attached to the ear-piece, e.g., by welding or soldering. The closing member is provided with a catch nose 27 hingedly attached to the body of the closing member 13 and which engages the opening 29 provided in the wall of the housing 3. The abutment shoulder 31 of the catch nose 27 prevents the catch hose 27 from projecting out of the opening 29 of the housing 3 and insures that the outer surface of the catch nose 27 is flash with the outer surface of the housing 3.

Generally, the opening 27 can be formed as depression in the wall of the housing 3 into which the catch nose extends thereby providing for retaining of the closing member 13 in the housing 3. In the embodiment of the spring hinge shown in FIG. 1, the opening or recess 29 extends through the entire thickness of the housing wall so that the catch nose 27 is accessible from outside and, therefore, can be easily disengaged. The catch nose 27 is connected with the body of the closing member 13 by a spring arm 33.

Figure 2:
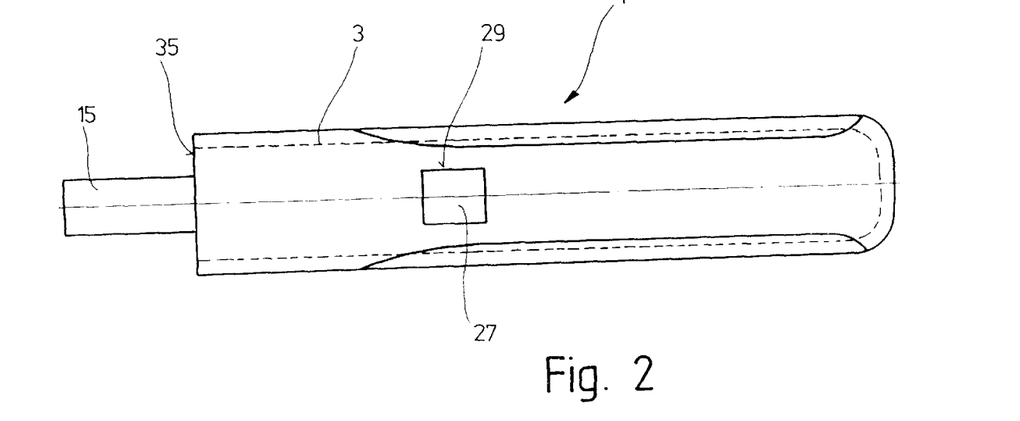
FIG. 2 is a plan view of the spring hinge shown in FIG. 1.

FIG. 2 shows that the gudgeon 15 projects from the end surface 35 of the housing 3 and is narrower than the latter. FIG. 2 also shows that the opening 29 for receiving the catch nose 27 is square. The dimensions of the opening 29 and the catch nose 27 are so selected that the inside of the housing 3 is protected from the penetration of dirt thereinto. Correspondingly, the dimensions of the closing element 13 are selected to likewise prevent the penetration of dirt into the inside of the housing 3 from the housing end surface 35.

Figure 3:
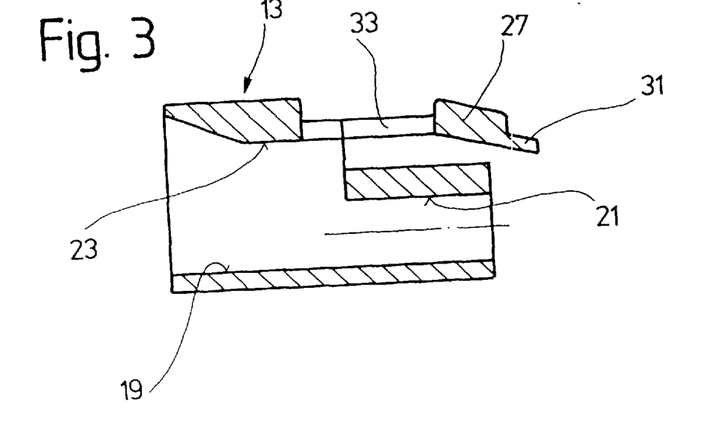
FIG. 3 is a longitudinal cross-sectional view of a closing element arranged in a housing of the spring hinge shown in FIG. 1.

FIG. 3 shows the closing member 13 alone. Here, the inner surface 19 serves as a guide surface for the hinge member 11. In addition, the inner surfaces of the closing member 13 include a second guide surface 21 and a third guide surface 23. The guide surfaces 19, 21 and 23 so cooperate with each other that the hinge member 13 is displaced in the interior of the closing member 13 practically clearance-free. This insures an optional displacement of the hinge member 11 in the inferior of the housing 3.

FIG. 3 also clearly shows the arm 33, which was discussed with reference to FIG. 1 earlier, with the catch note 27 and the abutment shoulder 31.

The inner dimensions of the closing member 13 are so adapted to those of the hinge member 11 that the hinge member 11, as it has already been discussed above, is displaced practically clearance-free.

Figure 4:
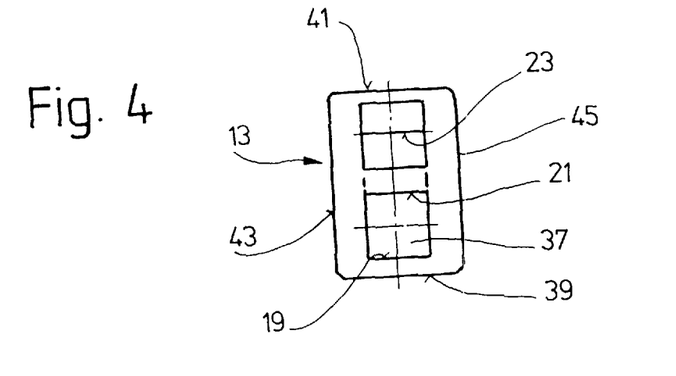
FIG. 4 is a front view of the closing member shown in FIG. 3.

The front view of the closing member 13, which is shown in FIG. 4, demonstrates that practically a square passage 37 is formed between the guide surfaces 19 and 21 through which the hinge member 11, which preferably has a likewise square section corresponding to this passage, extends. The end surface of the closing member 13 defines its operation surface the exact function of which will be discussed below.

The shape of the closing member 13 is adapted to the inner profile of the housing 3, so that, in an assembled condition of the spring hinge 1, the bottom 39 of the closing member 13 lies on the outer or upper surface of the ear-piece, with the top surface 41 abutting the inner surface 17 of the housing 3 and the side surfaces 43, 45 abutting respective inner side surface of the housing 3. In the assembled condition of the spring hinge 1, the closing member 13 is, thus, retained in the interior of the housing 3 practically clearance-free.

FIG. 4 also shows that the closing member 13 encloses the hinge member 11 from all sides, whereby a unitary structure is formed.

Figure 5:
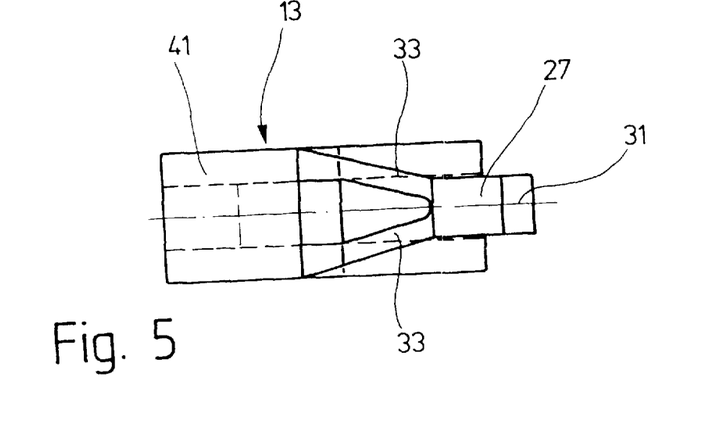
FIG. 5 is a plan view of the closing member shown in FIGS. 3–4.

The plan view of the closing member 13, which is shown in FIG. 5, demonstrates that the width of the catch nose 27 is smaller that the width of the closing member 13 itself. The spring arm 33, which supports the catch nose 27 can be formed as a continuous bridge. However, a smaller arm can be used. In the embodiment shown, these are provided two substantially V-shaped spring arms 33 which resiliently connect the catch nose 27 with the body of the closing member 13.

The catch nose 27, which according to FIG. 1 or 3 has an upper surface which is formed as a run-on inclined surface. It forms a quasi snap connection that holds the assembly, which is formed of the spring member 7, hinge member 11, and the closing member 13 in the interior of the housing 3. The catch nose 27 in held in the opening 29 of the housing 3 due to spring action of the spring arms 33.

The hinge member 11 as well as the closing member 13 are preferably formed of metal, in particular of nickel-free metal, preferably of titanium. This prevent an allergic reaction in a glasses wearer, on one hand, and on the other hand, reduces wear.

Figure 6:
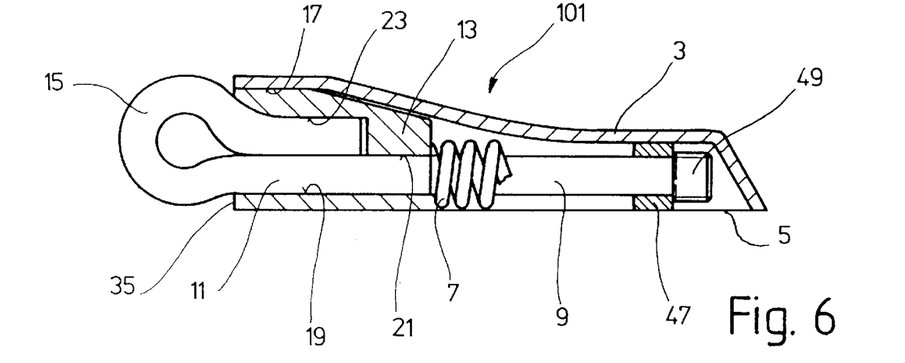
FIG. 6 is a cross-sectional view of another embodiment of a spring hinge produced according to the present invention.

FIG. 6 shows another embodiment of a spring hinge according to the present invention. In FIG. 6, the same reference numeral will be used for parts corresponding to the identical parts of the hinge spring shown in FIGS. 1–5. In the embodiment shown in FIG. 6, the spring hinge 101 has likewise a housing 3 in which a closing member 13 is received. A hinge member 11 extends through the closing member 11 and has an elongate extension 9 which extends through a spring member 7 which is also formed as a helical spring. The spring member 7 is supported at one end by the closing member 13 and, at the other end, by a stop ring 47 supported on the extension 9 of the hinge member 11 and is retained, e.g., by a widened portion formed at the free end of the hinge member 7. The spring member 7 is mounted on the extension 9 in a pre-loaded condition so that the hinge member is so drawn into the closing member 13 that the gudgeon 15 is drawn to the end surface 35 of the housing 3 and to the end surface of the closing member 13.

The housing 3 is so formed that neither the spring member 7 nor the hinge member 11 projects through the bottom 5 of the housing 3. Thus, when the housing 3 is mounted on a ear-piece, e.g., is solded thereto, the bottom of the closing member 13 flatly lies on the upper surface of the ear-piece. The top surface of the closing member 13 abuts the inner surface 17 of the housing 3 so that in the assembled condition of the spring hinge the closing member 13 is reliably held in interior of the housing 3 and forms a guide for the hinge member 11. The hinge member 11 has its surfaces supported on first and second guide surfaces 19 and 21 located adjacent to the support surface for the spring member 7. Closely to the end surface 35 of the housing 3, the closing member 13 has an inner guide surface 23 which is located opposite the first guide surface 19. The distance of the third guide surface 23 from the first guide surface 19 is greater than the distance of the second guide surface 21 from the surface 19. The greater distance of the third guide surface 23 from the first guide surface 19 is provided in order to accommodate the greater height of the hinge member 11 in this region. Preferably, the hinge member 7 is formed as a bent member, namely, as an elongate wire part which forms, in the gudgeon region, an eyelet having a backward extending portion which is supported against the third guide surface 23. The hinge member 11 of this embodiment can be produced very economically. A detailed discussion of manufacturing of the hinge member 11 will be made below with reference to FIG. 17.

Figure 7:
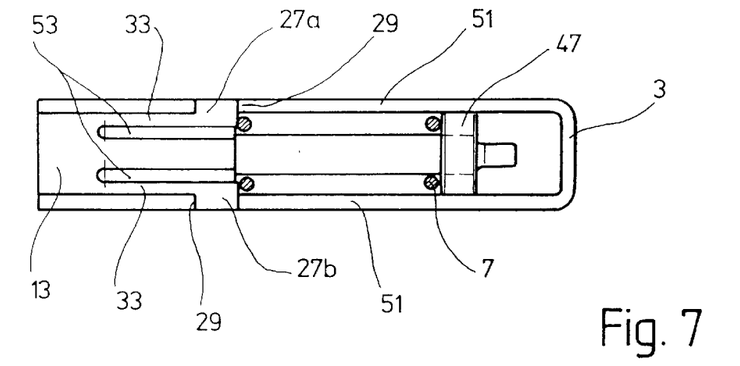
FIG. 7 is a bottom view of the spring hinge shown in FIG. 6.

From the bottom view of FIG. 7, it can be seen that the strop ring 47 is supported against inner surfaces of the housing 3 and, thus, can be reliably guided along the extension 9. The side walls of the closing member 13 adjoin the sides of the housing 3, insuring a reliable guiding of the closing member 13 in the housing 3.

In the embodiment shown in FIG. 6, the closing member 13 has two catch noses 27a and 27b which are resiliently supported by spring arms 33 on the body of the closing member 13. The catch noses 27a and 27b engage in openings 29 provided in side walls of the housing 3. Generally, the openings 29 are formed as indentations in side walls of the housing 3 in which the catch noses 27a and 27b engage. In the embodiment of FIG. 6, the openings 29 are formed as through openings, and the outer surfaces of the catch noses 27a and 27b are flash with the side outer surfaces of the housing 3 when the catch noses 27a and 27b engage in the openings 29. Thus, a visual appearance of the spring hinge 101 is no way disturbed, and the catch noses 27a and 27 are easily accessible for possible removal of the closing body 13. The catch noses 27a and 27b are engaged in the openings 29 with a snap action. The locking action of the spring arms 33 is assisted by the spring action of the spring member 7 which acts on inner sides of the catch noses 27a and 27b so that they are biased outwardly in the openings 29. When the ear-piece is overstretched, the hinge member 11, which is displaceable in the housing 3 against the biasing force of the spring member 7, is drawn out of the housing 3, and the spring member 7 becomes compressed. Thereby, the spring forces, which act in a locking direction of the catch noses 27a and 27b, increase, and as a result, the anchoring of the closing member 13 in the interior of the housing is insured when the spring hinge is loaded.

In the embodiment of FIG. 7, the bottom of the closing member 13 is practically closed. In this embodiment, the closing member 13 is provided with two slots 53 which define the spring arms 33 which connect the catch noses 27a and 27b with the closing member 13.

Figure 8:
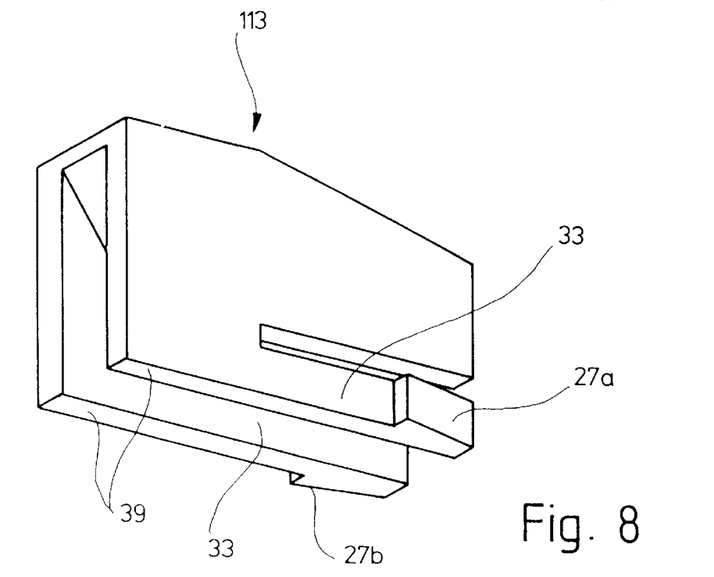
FIG. 8 is a perspective view of the closing member of the hinge spring.

FIG. 8 shows a modified closing member 13 which is characterized in that its bottom is open. In this embodiment, the hinge member, which is not shown in FIG. 8, is guided by guide surfaces similar to the second and third guide surfaces 21 and 23 shown in FIG. 6, and by upper surface of an ear-piece which support the closing member.

The perspective view of the closing member 113, shown in FIG. 8, clearly shows the shape of the catch noses 27a and 27b. In the embodiment of FIG. 8, the catch noses 27a and 27b have a somewhat conical surface that provides for the above-discussed snap connection when the catch noses 27a and 27b are pushed outwardly by the spring arms 33. The bottom 39 of the closing member 113 is made even so that it flatly lies on an upper surface of an ear-piece, insuring an optimal guidance of the hinge member 11.

The spring hinge of the embodiments of FIGS. 1 and 6 is characterized in that the unit, which is formed of the hinge member, spring member and the closing member and is inserted into the housing secured on the ear-piece, can be removed as necessary because the catch noses of the closing member are accessible from outside when the spring hinge is secured to the ear-piece.

Figure 9:
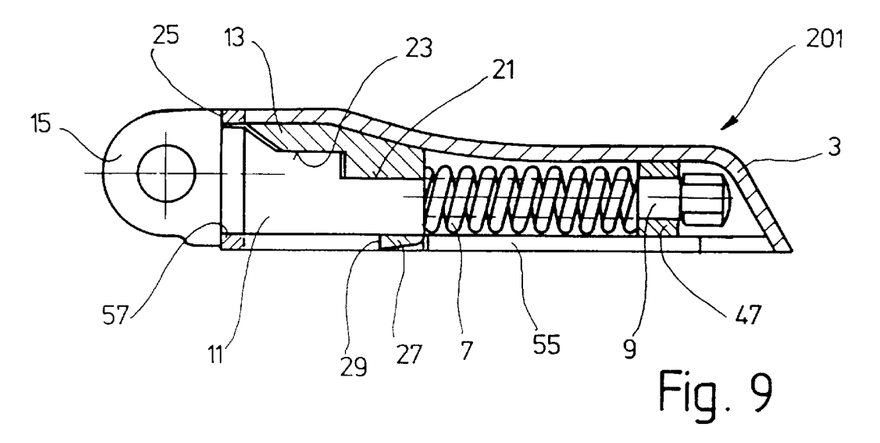
FIG. 9 is a cross-sectional view of a further embodiment of a spring hinge produced according to the present invention.

FIG. 9 shows another embodiment of a spring hinge according to the present invention. In FIG. 9, the parts identical with those of FIGS. 1 and 6 are designated with the same reference numerals. The spring hinge 221 shown in FIG. 9 has a housing 3, with the spring member 7 and the hinge member 11 being received in the housing interior. The hinge member 11 has an elongated extension 9 and a gudgeon 15 both forming parts of the one-piece hinge member 11. The hinge member 11 extends in the closing member 13 which surround the hinge member 11 at least as a horseshoe.

Figure 10:
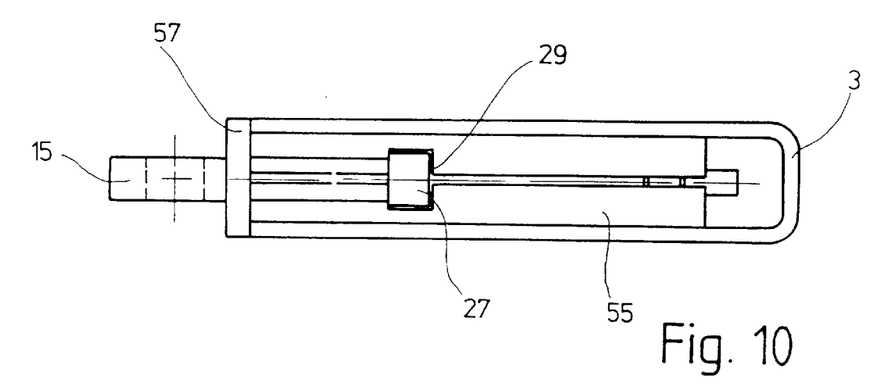
FIG. 10 is a bottom view of the spring hinge shown in FIG. 9.

As shown in FIG. 10, the housing 3 differs from the housing of the embodiments of FIGS. 1 and 6 in that it has a bottom 55 which encloses the assembly formed of the spring member 7, hinge member 11 and the closing member 13.

In the embodiment of FIG. 10, the closing member 13 is likewise provided with the catch nose 27 engaging in an opening 29 of the housing 3. In this embodiment, the opening 29 is formed in the bottom 55. Thus, after the spring hinge 102 is mounted on an ear-piece, the catch nose 27 is not accessible any more. In this embodiment, the interior of the housing 3 is better protected from dust and dirt as well as from the waste resulting from soldering of the housing to the ear-piece. As in the embodiment of FIG. 6, the spring member 9 is supported at one end thereof against a stop ring 47 secured on the extension 9 of the hinge member 11. The stop ring 47 is prevented from being dislodged by the deformation of the end portion of the extension 9.

The hinge member 11 lies with its bottom flatly on the inner surface of the bottom 55 which forms a first guide surface. The second guide surface 21 is formed adjacent to the spring member 7, and the third guide surface 23 is formed adjacent to the end surface of the housing 3. Providing these three guide surfaces insure a reliable guidance for the hinge member 11 in the closing member 13. The interior dimensions of the closing member 13 are so matched with those of the hinge member 11 that an optimal guidance of the hinge member 11 in the closing member 13 is insured.

Between the end surface of the housing 3 and the hinge gudgeon 15 which has a stop surface 25, a closing plate 57 can be provided for preventing the penetration of dirt into the interior of the housing 3.

As it is clearly seen in FIG. 10, the hinge member 11 is smaller than the housing 3. FIG. 10 further shows that the opening 29 is a through-opening which surrounds the catch nose 27 from all sides.

Figure 11:
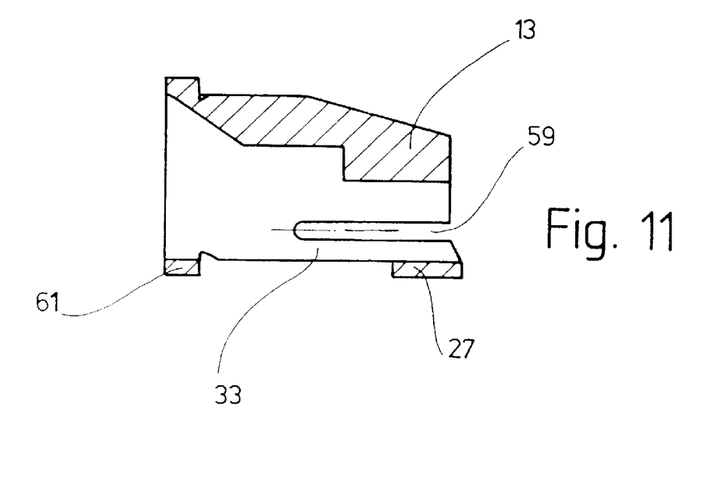
FIG. 11 is a longitudinal cross-sectional view of a closing element for the spring hinge shown in FIG. 9.

The closing member 13 of the spring hinge 201 shown in FIG. 9, has its spring arm 33, which connects the catch nose 27 to the body of the closing member 13, formed, as shown in FIG. 11, by a bar separated from the body of the closing member 13 by a slot 59. As shown further in FIG. 11, the closing member 13 can be provided with a bead 61 which served for closing the end surface of the housing 3 and can be used instead of the closing plate 57 shown in FIG. 9. In this case, the closing member forms a stop or the hinge member 11 and provides for a particular good guidance of the hinge member 11 in its interior.

The spring arm 33 can have its inner surface formed as a run-on inclined surface to which the spring member 7 applies a downward directed loading force displacing the catch nose 27 into its locking position. When the hinge member 11 is axially displaced leftward, in FIG. 9, the spring member applies an increased biasing force to the catch nose 27 providing for its better anchoring in the opening 29 in the bottom 57 of the housing 3.

Figure 12:
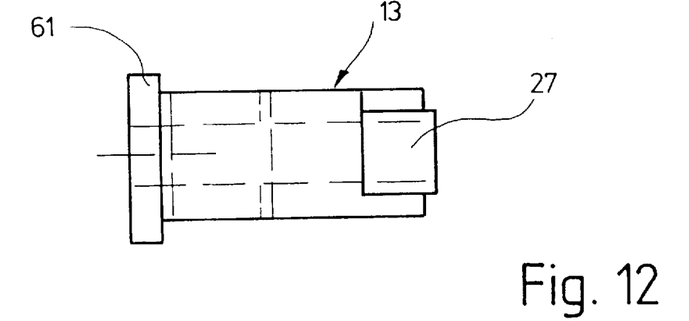
FIG. 12 is a bottom view of the closing member shown in FIG. 11.

As shown in FIG. 12, the width of the catch nose 27 is smaller than the width of the closing member 13, whereas the width of the bead 61 exceeds the width of the closing member 13, insuring closing of the housing 3, with the run-on surface on the cross-section of the housing 3 at the end surface being increased.

In the embodiment of FIG. 9, as in the previous embodiments, the housing is formed of a deformable material, preferably a material which can be deep-drawn. The closing member and the hinge member can be formed of plastic materials. However, preferably, a nickel-free material, such as titanium, is used for manufacturing the closing and hinge members.

Figure 13:
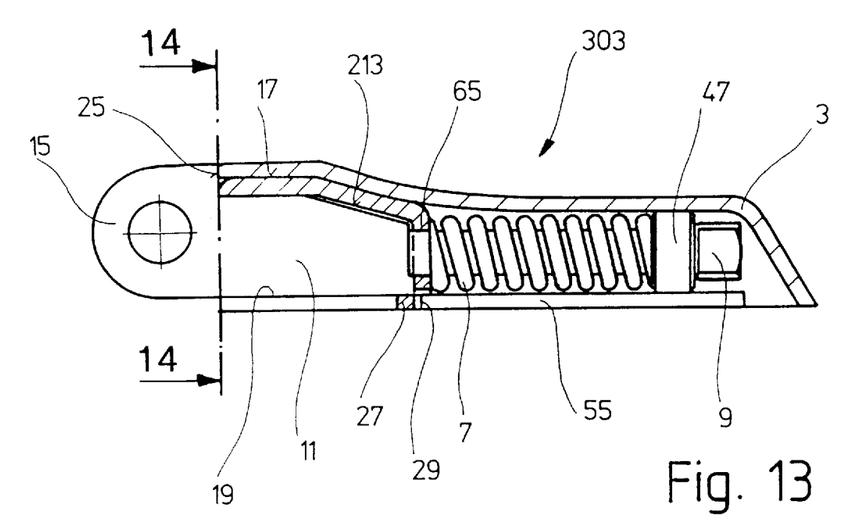
FIG. 13 is a cross-sectional view of a still further embodiment of a spring hinge produced according to the present invention.

FIG. 13 shows a yet another embodiment of a spring hinge according to the present invention, in which the same parts as i the other Figures are designated with the same reference numerals. The spring hinge 303 shown in FIG. 13, has a housing 3 with a bottom 55. As in the previous embodiments, a spring member 7, which is formed, e.g., as a helical spring, is mounted on the elongate extension 9 of the hinge member 11 and is supported against a stop ring 47 supported by a widened portion of the extension 9. The stop ring 47 forms a first stop for the spring member 7, with the closing member 214 defining another stop.

The hinge member 11 is provided with a gudgeon 15 which projects from the housing 3 and the dimensions of which are so selected that the stop surface 25 of the gudgeon 15 abuts the end surface of the housing 3. With the spring member being preloaded, the gudgeon 15 is pressed against the end surface of the housing 3. The bottom 55 of the housing 3 has a through-opening 29 in which a catch nose 27 of the closing member 213 engages. The closing member 13 is formed as a bent sheet material piece. The closing member 213 provides guide surfaces for a horizontal displacement of the hinge member 11 against the biasing force of the spring member 7. The closing member 213 has an opening 65 the circumference surface of which is so matched with the profile of the extension 9 of the hinge member 11 that the circumference surface forms a hinge displacement guide.

The closing member 213 has its upper surface flatly lying on the inner surface 17 of the housing 3 and its bottom side lying on the inner surface of the bottom 55 of the housing 3, which insures an optimal retaining of the closing member 213 in the housing 3.

Figure 14:
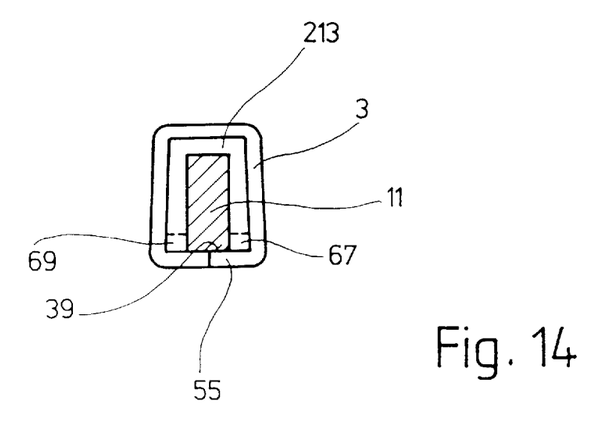
FIG. 14 is a cross-sectional view along line A—A in FIG. 13.

As shown in FIG. 14, the outer surfaces of the closing member 213 all lie on the respective inner surfaces of the housing 3 so that the closing member 213 is surrounded from all sides by the inner surfaces of the housing 3, whereby the closing member 213 is reliably contained in the housing 3. The closing member 213 has, at a bottom thereof, two side arms 67 and 69 the inner surfaces of which serve as guides for the hinge member 11. The bottom 39 of the closing member 213 flatly lies on the bottom 55 of the housing 3, insuring appropriate guiding of the hinge member 11.

Figure 15:
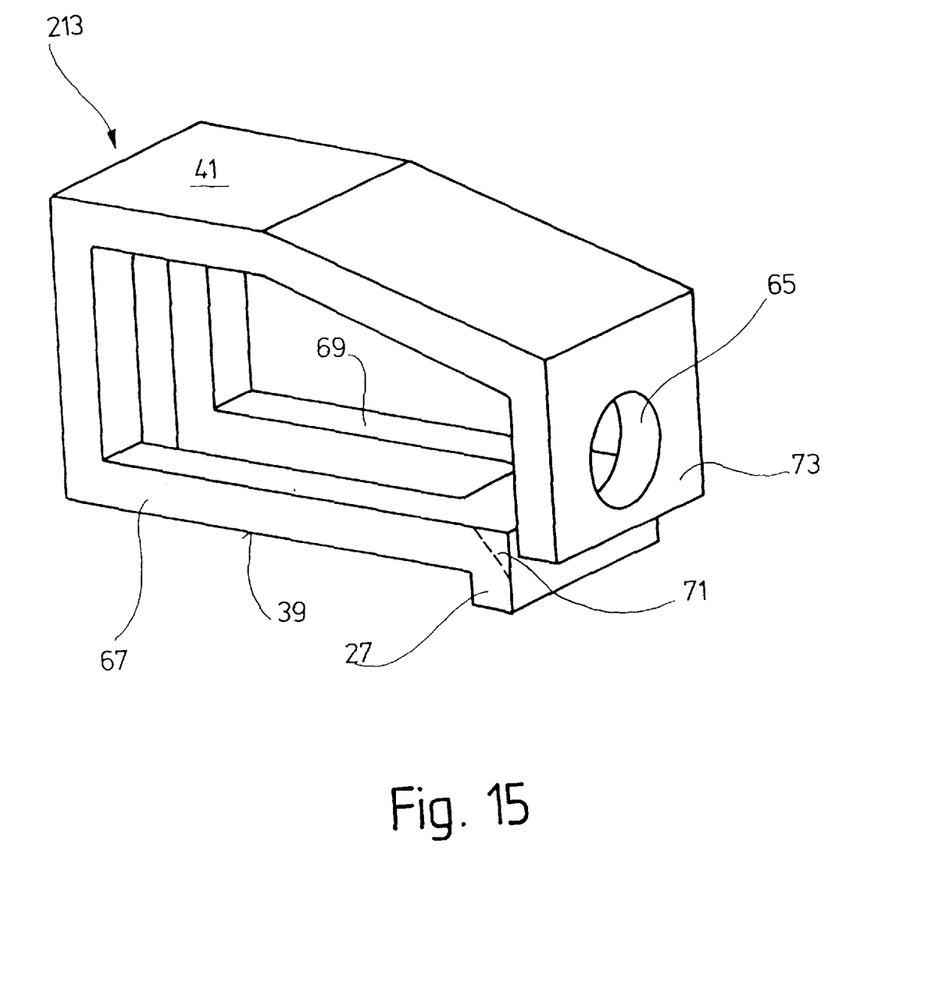
FIG. 15 is a perspective view of a closing member used with the spring hinge shown in FIG. 13.

FIG. 15, as discussed above, shows a perspective view of the closing member 213 shown in FIGS. 13–14. As discussed, the inner surfaces of the spring arms 33 support the hinge member 11 for its displacement in the closing member 213, with the extension 9 of the hinge member 11 projecting through the opening 65. The arms 67, 69 connect the catch nose 27 with the body of the closing member 213. The catch nose 27, as discussed, provides for retaining of the closing member 213 in the housing 3. As in the other embodiments, the spring member 7, the hinge member 11, and the closing member 213 form a unitary assembly that can easily be inserted into the housing 3.

In the embodiments of FIGS. 9 and 13, in which the housing 3 has a bottom 55, the unitary assembly of a spring member, a hinge member and the closing member is inserted in the housing 3 before the housing is secured to an ear-piece whereby a spring hinge assembly is formed. After the unitary assembly is inserted in the housing, the spring hinge assembly is secured on the ear-piece in any suitable manner. Because of spring characteristics of the spring hinge assembly, gluing is a preferable method of securing of the spring hinge assembly on an ear-piece. When soldering or welding on an ear-piece, the unitary assembly is inserted in the housing after the housing is secured on the ear-piece. This prevents the closing member from being subjected to the heat, associated with soldering or welding, which adversely affects the steadiness of the run-on surface of the closing member.

In the transition region between the side or spring arms 67, 69 and the catch nose 27, an inclined surface 71, as shown in FIG. 15, can be provided. With the spring member 7, which is formed as a tension spring, acting on the arm 73 of the closing member 213, the arm 73 is pressed against the inclined surface 71, pressing the catch nose 27 downward, further into its locking position. Thus, when an additional load is applied to the spring member 7, as a result of displacement of the hinge member 11 leftward, the locking action of the catch nose 27 is increased due to the application of an additional locking force to the catch nose 27. The spring hinge 303, shown in FIGS. 13–15, is characterized by an especially economical manufacturing of the closing member 213, which can be reliably retained in the spring hinge housing 3, with the upper surface 41 of the closing member 213 firmly abutting the inner surface 17 of the housing 3 and with bottom surfaces of the arms 67, 69 flatly lying on the inner surface of the bottom 55 of the housing 3. Due to the reliable retention of the closing member 213 in the housing 3, an optimal guidance of the hinge member is insured even when the closing member is formed from a sheet material insuring the inexpensive manufacturing of the closing member 213.

In case of the unitary assembly of the spring, hinge and closing members being inserted in a housing having a bottom with an opening in which the catch nose of the closing member engages for retaining the unitary assembly in the housing, after the housing is secured on the ear-piece, the unitary assembly cannot be withdrawn from the housing any more because the catch nose is not accessible from the outside. If the spring hinge is formed as a prefabricated unit and then is secured on an ear-piece, the catch nose remains accessible before the unit is secured on the ear-piece. In this case, the unitary assembly of the spring, hinge and closing members can be withdrawn from the housing.

In all of the cases, the simple construction of the unitary assembly insures its easy mounting in a housing secured or securable on an ear-piece, a reliable retaining of the closing member in the housing, and at the same time, optimal displacement of the hinge member in the housing. In addition, the closing member is provided with a bearing surface with optimal characteristics which are not adversely affected by tempering during soldering or welding of the housing to an ear-piece.

In all cases, a simply manufactured stamping can be used as a housing which insures economical manufacturing of the spring hinge.

Because the closing member is surrounded by the housing at least from three sides, with the fourth side being closed by an ear piece, dust, lacquer and/or polishing compounds cannot penetrate into the spring hinge, which insures a very high functionality of the spring hinge. Because the end surface of the housing is also practically completely closed by the closing member and firmly abuts an ear-piece, a spring hinge completely protected from any penetration of dirt is produced, without any substantial expenses. Also, the use of the closing member for guiding of the hinge member further reduces the constructional expenses and the manufacturing costs.

Figure 16:
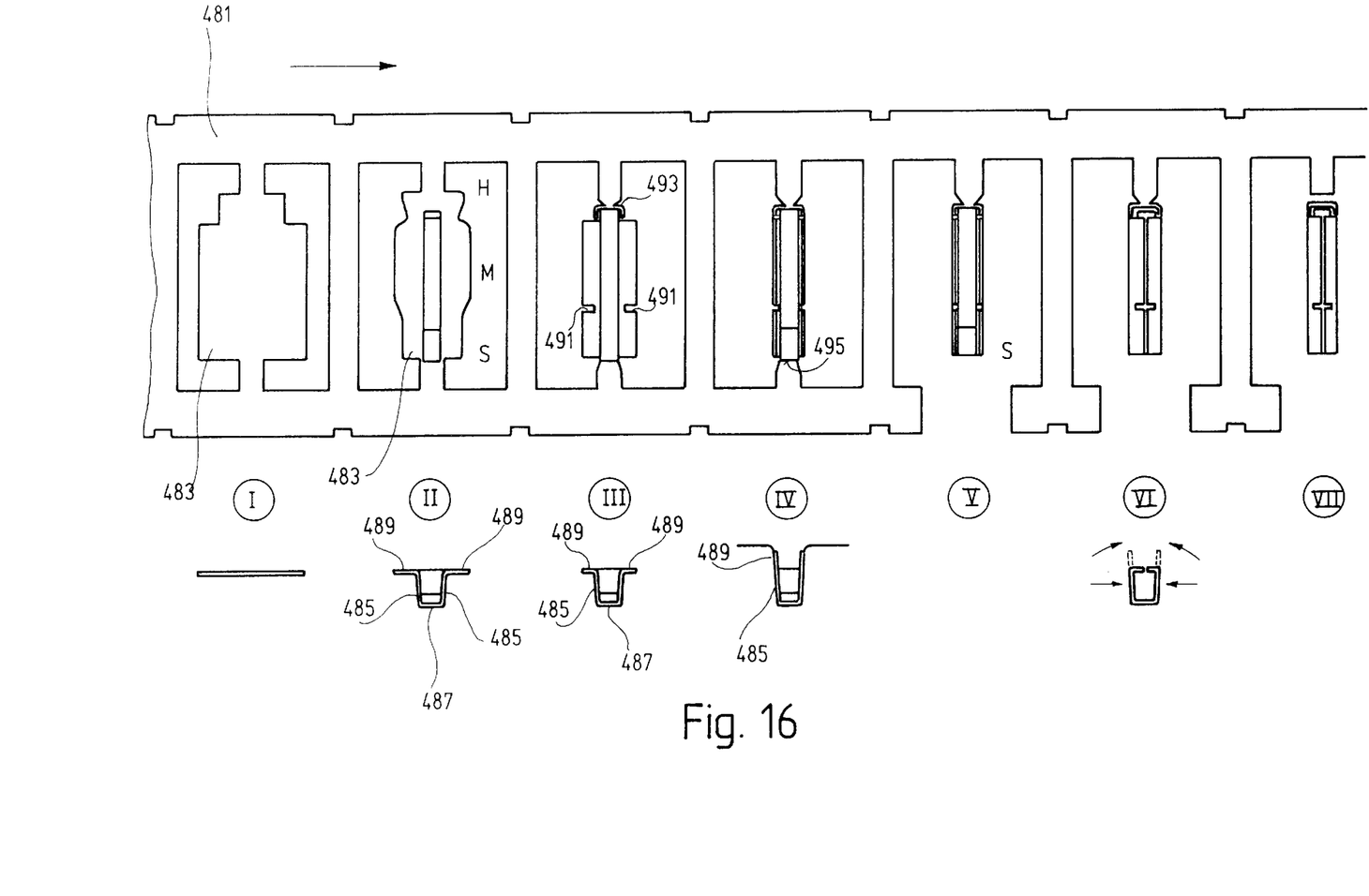
FIG. 16 is a schematic diagram showing a manufacturing process of producing a spring hinge housing according to the invention.

FIG. 16 shows by way of an example, seven steps of manufacturing of a spring hinge housing. As an initial material, a metal strip 481, e.g., of a nickel-free material such as titanium is used. The strip thickness of the strip 481 correspond at that the predetermined maximal thickness of the housing walls.

In the first step, a surface 483 is cut free, e.g., punched free. This surface is somewhat larger than the surface of a "folded" housing.

In the second step, a side wall 485 of the housing is stamped, e.g., drawn. Thereby, a U-shaped piece is produced formed of the side walls 485 and the housing outer side 487. The two non-drawn side regions of the surface 483 form wings 489. Because the outer side 487 of the housing is tapered from the end side region S toward the opposite region H (compare with FIG. 1), side walls 485 are higher in the region S than in the middle region M and the region H. Correspondingly, the wings 489 are wider in the region M than in region S.

The non-uniform profile of the wings 489 is corrected in the third step. Simultaneously, notches 491, which are mirror symmetrical with respect to the longitudinal axis, are formed in the wings 489. Both the correction of the non-uniform profile of the wings 489 and the notches 491 are effected by stamping. In the third step, both wings 489 are bent upward in the rear region H, providing for a neat transition between the rear wall 493 and the side wall 485.

In the next, fourth step, the wings 489 are bent upward along the entire length of the housing so that they lie in the same plane with the side walls 485, respectively.

In the fifth step, a strip 481 is cut free at the end surface region S of the material strip, so that the housing is connected with the initial strip only at the rear housing wall 493. Because the strip is cut free not at the edge 495 but further inward, a through-opening is formed at the end surface or side S.

Into this opening in the sixth step, a bending mandrel is inserted which provides for a predetermined alignment of the side walls 485 and the folding of the wings 489.

The arrows P indicate that not only the wings 485 are subjected to a pressure force. The inwardly bent wings 489 form the housing bottom, with the notches 491 forming the recesses for receiving the catch noses of the closing member.

In the last, seventh step, the rear housing wall 493 is cut off from the strip 481, and a finished housing is obtained.

Figure 17:
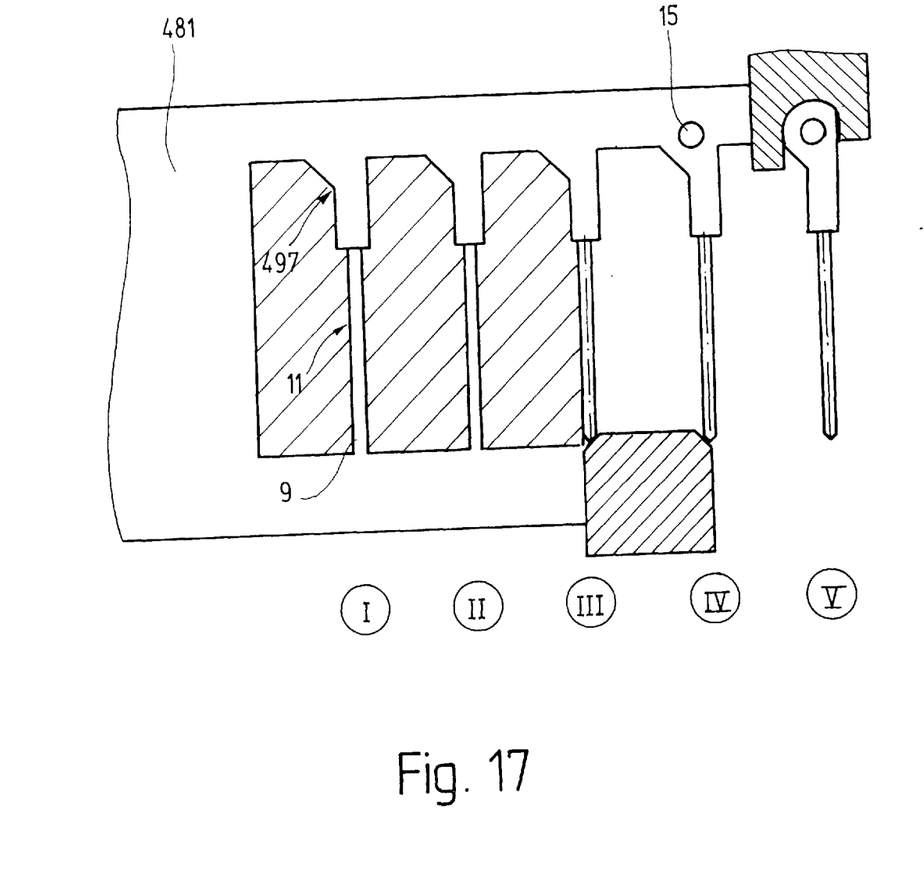
FIG. 17 is a diagram showing a manufacturing process of producing a hinge member according to the present invention.

FIG. 17 shows, by way of an example, manufacturing of a hinge member shown in FIGS. 1–13.

As in the manufacturing of the housing, a strip 481 is used. The strip 481, as in the case of a housing, is formed of a nickel-fill material, such as titanium. In the first step, a basic profile of the hinge member is cut out. First, the basic profile of the elongate extension 9 and at least a portion of a region 497, which adjoins the extension 9 and in which later a gudgeon is formed, e.g., stamped. The region 497 and the opposite end of the extension 9 are connected with the strip 481.

Naturally, the hatched cut-free region can be extended toward the metal strip edge so that the cut-free hinge element 11 is connected with the strip 481 only at one side.

In the second step, the extension 9 is provided with the required rounding, e.g., with two semi-circular stamping dies.

In the third step, the strip region between two adjacent extensions is cut off, e.g., with a punching die.

In the fourth step, the connection between the extension 9 and the strip 489 is completely cut off. Simultaneously, a gudgeon 15 is formed in the region 497, e.g., with a punching die.

In the fifth step, shaping of the gudgeon region of the hinge member and its complete separation from the metal strip 481 takes place. This operation is likewise preferably is effected with a punching die.

The closing member can be produced in a similar manner, in the same way as the housing and the hinge member are produced. The closing member is likewise produced from a metal strip with the use of punching and stamping tools and folding steps. As in case of manufacturing of housing and hinge member parts, a nickel-free, e.g., a titanium metal strip is used.

From FIGS. 16–17 and the related description, it should be clear the manufacturing of the spring hinge parts is very simple and thereby is very cost-effective. Expansive profile sections from which the housing and the hinge member were produced, are not needed any more. Likewise is eliminated the previously used machining of these profile sections.

Figure 18:
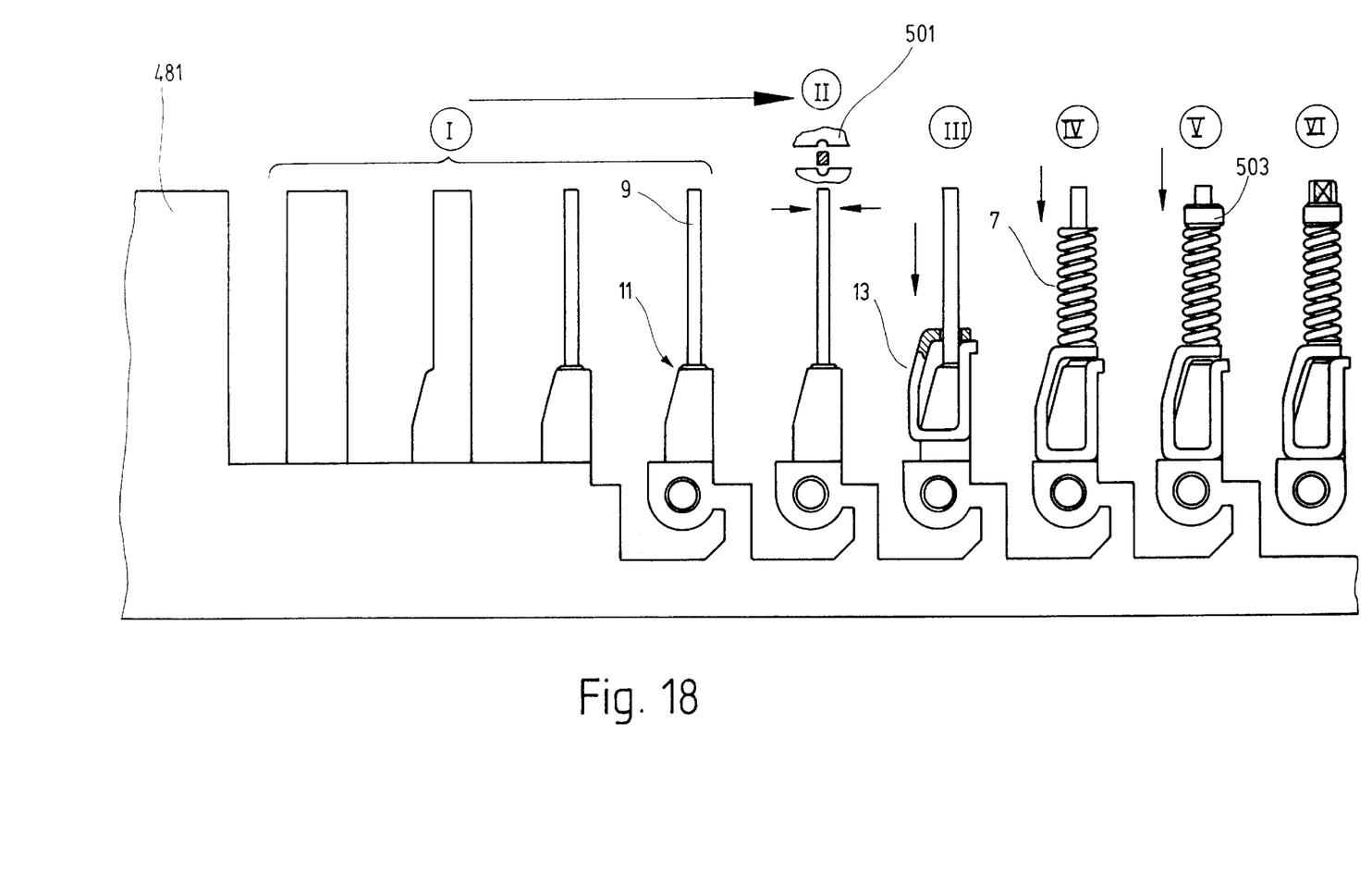
FIG. 18 is a diagram showing separate steps of a process of assembling a spring hinge according to the present invention.

FIG. 18 shows schematically an assembly of the unitary unit consisting of the spring, hinge and closing members 7, 11 and 13, respectively.

In the first and second steps, a hinge member 11 is cut out of the metal ship 481 in a manner described with reference to FIG. 17. The sketch of the second step shows forming of rounded profile of the extension 9 from a rectangular profile with two semi-circular stamping die s 501.

In the next, third step, the closing member 13 is pushed over the hinge member 11. In the following forth step, the spring member 7 is pushed over the extension 9 of the hinge member 11 and is secured thereon with a sleeve 503 in the fifth step. In the sixth step, the free end of the extension 9 is squeezed for retaining the sleeve 503. The flat surface, obtained as a result of squeezing, is designated with "X".

The unitary unit, after being assembled, is separated from the strip 481 by cutting the gudgeon containing hinge member region from the metal ship 481, still in the step 6.

Naturally, the unitary unit can remain connected to the metal strip 481 to insure a better handling in comparison with handling of separate unitary units.

Figure 19A:
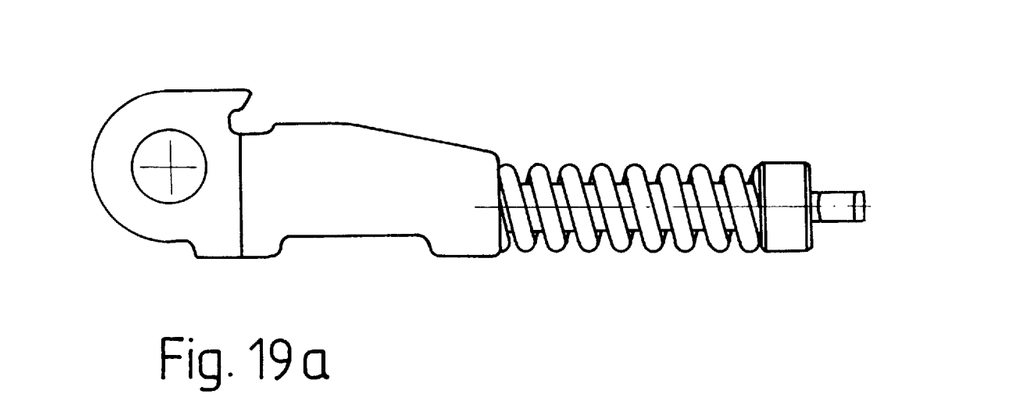
FIG. 19a is an elevational view showing a spring hinge formed only of two parts—a hinge member and a spring member.

The above-described process can also be used when the unitary unit consists only of spring and hinge members. In this case, the third step of FIG. 18 is eliminated. This process is shown in FIG. 19*a*.

Figure 19B:
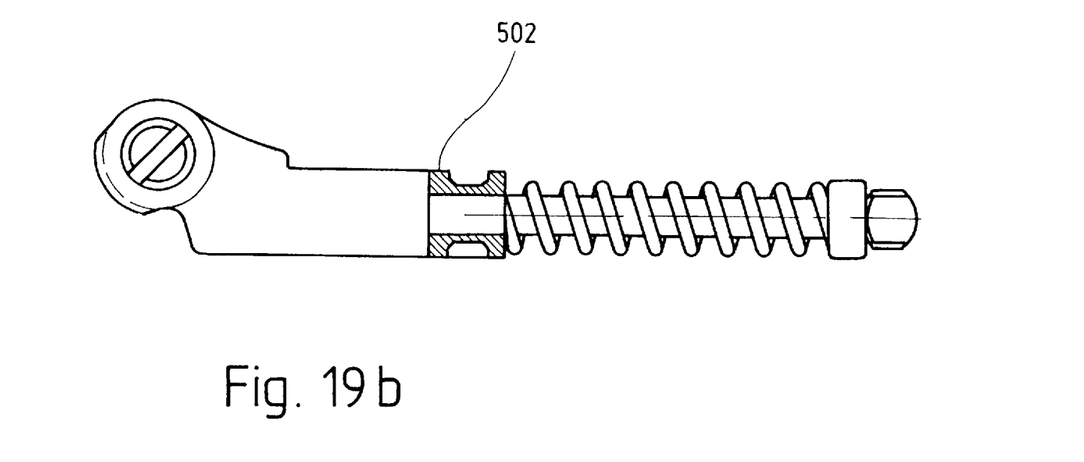
FIG. 19b is an elevational view showing a spring hinge similar to that of FIG. 19a but including a locking ring instead of a locking element.

Instead of a closing member, a lock ring 502 can be used, which insures locking with lock beading. This is shown in FIG. 19.

The spring hinge shown in FIGS. 1–15 is characterized in that the hinge member which, together with the spring and closing members, form a unitary assembly is easily insertable into the housing and is reliably secured therein, and in that closing member is formed as a snap-locking element. Upon the insertion, the unitary assembly is locked in the housing, without any need for other connecting means which makes assemblying of the spring hinge more expansive.

Despite an easy assembly, a very exact guidance of the spring member is achieved because it is guided entirely through the closing member. In the embodiment shown in FIG. 8, the guiding of the hinge member is insured by forming the closing member as a U-shaped member, with the hinge member flatly abutting the ear-peace on which the spring hinge is mounted. Thus, guiding of the hinge member on all sides of the hinge member is insured.

An especially good guiding of the hinge member is insured when the geometrical parameters of the closing member, length L, height H and the width B, have the following relationship: L>H>B. These dimensions insure, on one hand, a reliable retaining of the closing member in the housing, insuring a clearance-free seating of the closing member in the housing, and, on the other hand, a good guiding of the hinge member due to the reliable retaining of the closing member in the housing and due to a clearance-free displacement of the hinge member in the closing member.

Though the spring hinge has a very economically produced stamped housing in which the unitary unit can easily and simply be secured, very high technical characteristics are achieved that up to the present could be achieved only with very high manufacturing costs.

The cost-effective manufacturing of a spring hinge according to the present invention is achieved by eliminating special guide means in the spring hinge housing due to a particular shape of the closing member which also permitted to eliminate special locking elements used up to now for securing the hinge member inside the housing.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

I claim:

1. A method of manufacturing a hinge including at least a housing and a hinge member, the method comprising the steps of:

providing a strip material for forming the hinge member;

cutting free a region from the strip material substantially corresponding to a shape of the hinge member;

pressing the cut-free region of the strip material to form a substantially round extension of the hinge member;

punching the cut-free region of the strip material to form a gudgeon of the hinge member;

separating the hinge member from the strip material;

providing a hinge housing; and mounting the hinge member in the hinge housing.

2. A method of manufacturing a hinge as set forth in claim 1, further comprising the step of mounting a spring member on the hinge member before separating the hinge member from the strip material, whereby a structural unit is formed.

3. A method of manufacturing a hinge as set forth in claim 8, further comprising the step of equipping the structural unit with any one of a closing member and a lock ring.

4. A method of manufacturing a hinge as set forth in claim 3, wherein the any one of a closing member and a lock ring is mounted on the hinge member before mounting of the spring on the hinge member.

5. A method of manufacturing a hinge as set forth in claim 3, wherein the step of mounting comprises mounting the structural unit in the hinge housing.

* * * * *

UNITED STATES PATENT AND TRADEMARK OFFICE
CERTIFICATE OF CORRECTION

PATENT NO.     : 5,822,840
DATED          : October 20, 1998
INVENTOR(S)    : Heinz Mössner, et al It is certified that error appears in the above-identified patent and that said Letters Patent is hereby corrected as shown below:

On title page, item

[73]    Assignee:    OBE Ohnmacht & Baumgärtner GmbH & Co. KG, Ispringen, Germany Signed and Sealed this Fifth Day of October, 1999

Attest:

Q. TODD DICKINSON

*Attesting Officer*    *Acting Commissioner of Patents and Trademarks*